United States Patent [19]

Ahrens et al.

[11] 3,749,966

[45] July 31, 1973

[54] HIGH VOLTAGE HOLD DOWN CIRCUIT FOR HORIZONTAL DEFLECTION CIRCUIT

[75] Inventors: Paul Raymond Ahrens; Jerome Benjamin Bean, Jr., both of Indianapolis, Ind.

[73] Assignee: RCA Corporation, New York, N.Y.

[22] Filed: Jan. 4, 1971

[21] Appl. No.: 103,713

[52] U.S. Cl. .............................. 315/27 TD, 315/20
[51] Int. Cl. .............................. H01j 29/70
[58] Field of Search ...................... 315/27 R, 27 TD, 315/28, 29, 20

[56] References Cited

UNITED STATES PATENTS

| | | | |
|---|---|---|---|
| 3,502,941 | 3/1970 | Buechel | 315/27 TD |
| 3,205,401 | 9/1965 | Fyler et al. | 315/27 TD |

*Primary Examiner*—Carl D. Quarforth
*Assistant Examiner*—J. M. Potenza
*Attorney*—Eugene M. Whitacre

[57] ABSTRACT

In a horizontal deflection circuit including a voltage supply for developing the kinescope high voltage, a switching diode is coupled from a capacitor in series with the flyback transformer to a control element of a voltage controlled horizontal oscillator to disable the oscillator or change its frequency to prevent the high voltage from increasing to an excessive level in the event the damper diode becomes open circuited.

8 Claims, 1 Drawing Figure

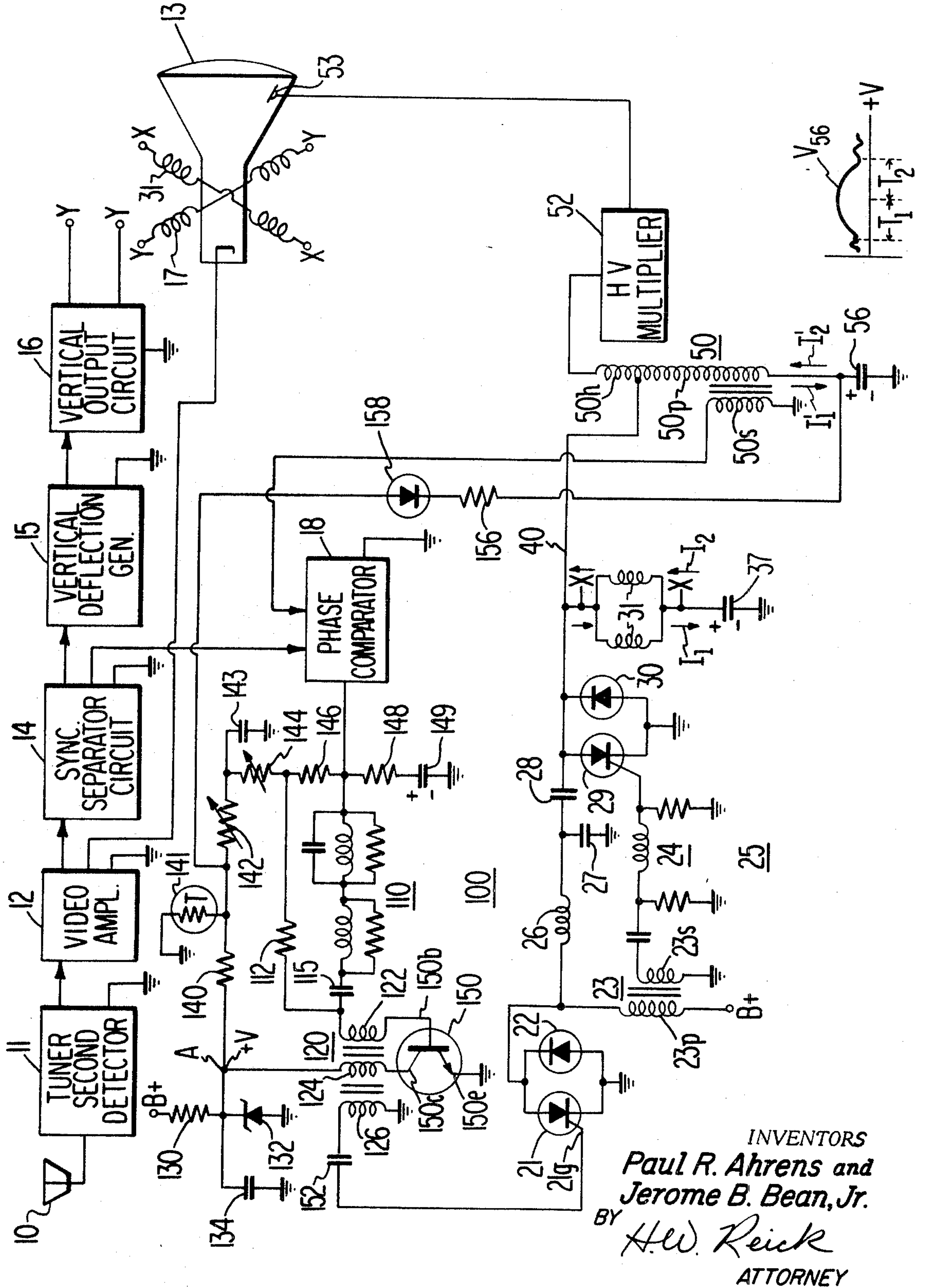
INVENTORS
Paul R. Ahrens and
Jerome B. Bean, Jr.
BY H.W. Reick
ATTORNEY

HIGH VOLTAGE HOLD DOWN CIRCUIT FOR HORIZONTAL DEFLECTION CIRCUIT

This invention relates to electrical circuits and more particularly to deflection circuits of the type used to develop a high voltage.

In many horizontal deflection circuits, a damper diode is coupled across the horizontal output transformer primary winding to damp out oscillations which would occur due to the ringing caused by the flyback pulse during the retrace portion of each deflection cycle. The damper diode is poled to conduct when the flyback voltage swings across the zero voltage level. In addition to providing a damping function, during a first part of trace this diode conducts to provide a current path for yoke current which is in a direction to place a charge on an S-shaping capacitor serially coupled to the yoke.

In some horizontal deflection output circuits, a high voltage multiplier is employed to develop the ultor voltage. Such a multiplier is described in detail in a copending application Ser. No. 830,026, entitled "ULTOR VOLTAGE SUPPLY," filed on June 3, 1969 and assigned to the present assignee, now abandoned. When a multiplier circuit of this type is utilized in conjunction with any horizontal output deflection stage, it rectifies the peak-to-peak voltage present at its input. If the damper diode is open circuited, and therefore allows the flyback voltage to swing negative as well as positive, the peak-to-peak voltage appearing at the input to the voltage multiplier may rise causing the output voltage to rise to an excessively high value (for example, 40,000 volts as compared to the normal 26,500 volts). If the ultor voltage reaches this level, the phosphor on the face of the kinescope will be destroyed due to the impacting high energy electrons. Also, an X-radiation hazard may exist. Thus, it is important to hold the high voltage to a safe level if the damper diode fails.

The damper diode may become open circuited due to an electrical failure within the device. More commonly, however, when diodes are utilized which are mechanically clipped into the horizontal output stage, it is possible during servicing that the diode is either not replaced, or a faulty electrical connection is made at the mechanical terminals.

It is therefore an object of the present invention to prevent the ultor voltage from reaching an excessive level in a deflection output stage utilizing a high voltage multiplier when the damper diode current path is removed.

One proposed solution to this problem is described in a copending application entitled "HIGH VOLTAGE HOLD DOWN CIRCUIT" by J. J. McArdle and R. L. Rauck, Ser. No. 36,046 filed on May 11, 1970, now U.S. Pat. No. 3,697,800 and assigned to the present assignee. In the circuitry of that application, a hold down voltage was applied directly to a control electrode of an output device in the horizontal output stage. In certain circuits, such as the two silicon controlled rectifier type shown in that application; although the protection circuit operates to prevent damage to the color kinescope, in some instances the silicon controlled rectifier was destroyed due to excessive gate current drawn by the protection diode during the failure mode of operation, during kinescope arcing or during the initial application of operating power to the receiver. The circuit of the present invention, however, will maintain the high voltage supply at a safe level in the event of the loss of conduction of the damper diode without damaging the horizontal output active device.

Deflection circuits embodying the present invention are of the type employing a deflection signal generator, which may include suitable automatic phase and frequency control apparatus, driving a power output stage which includes means for developing a high voltage from the flyback pulse developed in the circuit. The power output stage includes a diode to provide a conduction path for deflection current during a portion of each deflection cycle. In the event the diode opens, the direct voltage level at a point in the power output stage changes and is used to alter the frequency of operation of the deflection signal generator to prevent the generation of an excessive high voltage. It is contemplated that the frequency of the deflection signal generator can be altered to zero frequency.

The operation of the present invention can be best understood by referring to the sole FIGURE and description thereof in which:

FIG. 1 is a circuit diagram partly in schematic and block form of a television receiver embodying the present invention.

In FIG. 1, the television receiver includes an antenna 10 which receives composite television signals and couples them to a tuner second detector stage 11. This stage normally includes a radio frequency amplifier for amplifying the received signals, a mixer-oscillator for converting the amplified radio frequency signals to intermediate frequency signals, an intermediate frequency amplifier; and a detector for deriving composite television signals from the intermediate frequency signals. The output of stage 11 is coupled to a video amplifier 12 which amplifies the synchronization, and brightness representative portion of the composite television signals and applies these signals to a control electrode (e.g., the cathode) of a television kinescope 13. The composite television signal from video amplifier 12 is also applied to a synchronizing signal separator circuit 14 which separates the synchronization signals from the video signals, and also separates the vertical and the horizontal synchronizing signals. The separated vertical synchronizing signals are coupled from sync separator stage 14 to a vertical deflection generator 15 which develops vertical frequency signals. The output of vertical deflection generator 15 is coupled to the vertical output circuit 16 which provides the required vertical deflection current to a vertical deflection winding 17 associated with a kinescope 13 by means of terminals Y—Y.

Horizontal synchronizing pulses derived from sync separator 14 are applied to a phase comparator 18, which is also supplied with a second signal related in time occurrence to the operation of a horizontal oscillator 19 by means of a secondary winding **50*s* on a horizontal output transformer 50. An error voltage is developed in the phase comparator 18 and is applied to a horizontal oscillator stage 100** to synchronize the horizontal oscillator frequency to that of the horizontal synchronizing pulses.

Horizontal oscillator stage 100 includes a transistor 150 having a base terminal **150*b*, a collector terminal 150*c* and an emitter terminal 150*e*. The emitter terminal 150*e* is coupled directly to ground. Oscillator 100 is of the blocking oscillator type employing a transformer 120 having a first winding 122 with a first terminal coupled to the base terminal 150*b* of transistor 150 and a second terminal remote from the base terminal connection coupled to the phase comparator 18 by means of a series combination of a coupling capacitor 115 and a waveshaping network 110. The junction of capacitor 115 and transformer 122 is also coupled to the junction of an adjustable resistor 144 and a resistor 146 by means of a resistor 112. A secondary winding 124 on transformer 120 has a first terminal coupled to the collector terminal 150*c* of transistor 150 and a second terminal coupled to a circuit terminal A. A third winding 126 on transformer 120 has a first terminal coupled directly to ground and a second terminal coupled to the horizontal output stage 25 by means of a coupling capacitor 152.**

A regulated voltage supply employed to provide operating power for the oscillator comprises a voltage dropping resistor 130 coupled from a voltage source (B+) to a voltage regulating device such as a Zener diode 132. The Zener diode 132 is bypassed by a filter capacitor 134. Terminal point A which is coupled to the junction of the voltage dropping resistor 130 and the Zener diode 132 is thereby maintained at a relatively constant voltage indicated as +V in the FIGURE during normal operation.

As well as supplying the operating voltage for the transistor 150, this regulated voltage supply (+V) supplies the charging current which flows through the series combination of resistors 140, 142, 144, 146 and 148 to charge capacitor 149 in the polarity shown in the diagram to develop the turn on voltage for transistor 150. Adjustable resistor 144 is the frequency limiting resistor, whereas adjustable resistor 142 is the horizontal hold control for finely adjusting the exact frequency of the horizontal oscillator 100. Thermistor 141 is coupled from the junction of resistors 140 and 142 to ground, and a capacitor 143 is coupled from the junction of resistors 142 and 144 to ground. The junction of resistor 140 to resistor 142 is coupled to a capacitor 56 in series with a primary winding **50*p* of a flyback transformer 50 by means of the series combination of a diode 158 and a resistor 156.**

The operation of the blocking oscillator type horizontal oscillator stage 100 is described in detail in the publication "Solid State Color Television" published by RCA Sales Corporation, 600 N. Sherman Drive, Indianapolis, Ind., and will not be described here. Oscillator 100 provides horizontal deflection output signals across winding 126 of transformer 120. These drive signals are applied to a horizontal output stage 25 by means of the coupling capacitor 152.

The operation of the deflection circuit 25 is described in detail in U.S. Pat. No. 3,452,244 assigned to the present assignee. The deflection circuit comprises a bi-directionally conductive trace switching means including a silicon controlled rectifier (SCR) 29 and a parallel coupled diode 30. The trace switching means couples a relatively large S-shaping capacitor 37 across deflection winding 31 during the trace portion of each deflection cycle. A first capacitor 28 and a commutating inductor 26 are coupled between the trace switching means and a bi-directionally conductive retrace switch which includes a semiconductor device (SCR) 21 and a parallel coupled diode 22. A second capacitor 27 is coupled from the junction of capacitor 28 and inductor 26 to ground. A B+ voltage supply is coupled to a relatively large supply inductor 23 which is further coupled to the junction of commutating inductor 26 and the commutating switching means 21, 22.

An output transformer 50 having a primary winding **50*p* is coupled across the combination of deflection winding 31 and capacitor 37 by a capacitor 56 coupled between the low voltage terminal on the primary winding to ground. A high voltage winding 50*h* provides voltage pulses to a high voltage multiplier 52. Multiplier 52 multiples the applied voltage to supply at its output, the ultor voltage which is coupled to a terminal 53 on kinescope 13.** Having described the circuit, the operation of the invention included therein follows.

As the trace interval of each deflection cycle is initiated, current flowing in yoke 31 is at a maximum value due to prior circuit action involving resonant energy exchanges between inductors 23 and 26, capacitors 27 and 28, the high voltage circuit and deflection winding 31. Yoke current at this time is in a direction illustrated by the arrow accompanying the symbol $I_1$ in FIG. 1. At this time (the beginning of trace), damper diode 30 conducts to complete the yoke current path and current $I_1$ flows in a direction to impress a voltage of a polarity shown in the diagram on capacitor 37.

At the mid-point of trace, which corresponds to the center of the scanned raster, the magnitude of current $I_1$ has decreased to zero and SCR 29 is triggered into conduction by means of a trigger circuit 24 which is supplied by a signal from a winding **23*s* on an input reactor 23. As the second portion of the trace interval begins, capacitor 37 supplies energy to the yoke and the current is in a direction illustrated by the arrow accompanying the symbol $I_2$ (i.e., opposite to the direction of $I_1$). SCR 29 completes the yoke current conduction path. During the latter portion of the trace interval and prior to retrace, a signal from the horizontal oscillator 19 serves to trigger SCR 21 into conduction. This begins a complex series of energy exchanges between the reactive components as explained in detail in U.S. Pat. No. 3,452,244 cited above which serves to interrupt the yoke current path at the end of the trace portion of the deflection cycle by turning off SCR 29. As the yoke current, which is at a maximum value, is interrupted, the magnetic field associated with the yoke current begins to collapse producing a voltage pulse on a conductor 40** which is commonly referred to as the flyback pulse.

This pulse which appears on conductor 40 is positive in the present circuit and occurs during the retrace interval. At the end of retrace, the flyback voltage will start to swing negative. When diode 30 is operative, however, the voltage at conductor 40 is prevented from going negative, since diode 30 conducts to clamp the voltage at approximately −0.7 volts. If for any reason diode 30 is not conductive, the flyback pulse will be allowed to swing negative, and the peak-to-peak input voltage to the high voltage multiplier 52 will be nearly doubled, thereby producing an ultor voltage of an undesirably high level. By adding a diode 158 and a resistor 156 between the horizontal oscillator and capacitor 56, however, the high voltage will be prevented from rising to an excessive level.

During normal circuit operation, the voltage across capacitor 56 varies as illustrated by the voltage waveform $V_{56}$ shown by the waveform diagram adjacent capacitor 56. During the first portion of each horizontal trace interval (the period shown as $T_1$ in the waveform diagram), a current $I_1'$ flows in the direction shown by the accompanying arrow to charge capacitor 56 with the voltage polarity shown in the diagram. During the latter portion of each horizontal trace interval (indicated by $T_2$ in the diagram), a discharge current $I_2'$ flows in the direction shown by the accompanying arrow from capacitor 56 to ground through trace SCR 29. Currents $I_1'$ and $I_2'$ are similar in wave-shape to the horizontal deflection currents $I_1$ and $I_2$ and are conducted by diode 30 and SCR 29 as is current $I_1$ and $I_2$. When the diode 30 is conducting normally, an average DC voltage across capacitor 56 will exist which is greater than the +V regulated source used to supply the horizontal oscillator. When, however, the damper diode does not conduct during the $T_1$ interval, there will not be a charging current path for current $I_1'$ and the average DC voltage across capacitor 56 will drop to a value considerably below the +V source voltage and may swing negative. As this occurs, diode 158 will become forward biased thereby coupling the junction of resistor 140 and resistor 142 to the voltage across capacitor 56 by means of a current limiting resistor 156, thus lowering the potential between resistors 140 and 142 which exists during normal operation. By lowering the voltage at this circuit point, the time required to charge capacitor 149 to a level to drive horizontal oscillator transistor 150 conductive is increased, thereby lowering the horizontal oscillator output frequency. In the SCR type deflection circuit shown, the decreased frequency horizontal drive signals to the gate 21*g* of SCR 21 has the effect of decreasing the energy supplied to the horizontal deflection yoke and flyback transformer primary winding, thereby decreasing the high voltage generated by the high voltage multiplier 52. Resistor 156 must be sufficiently large to allow the horizontal oscillator voltage source to initially raise to a sufficient value to start the oscillator when the receiver is first activated. In one circuit tested, resistor 156 had a value of 2.2 kilohms and the horizontal deflection frequency was reduced to approximately 8.6 KHz when the diode 30 was removed and the high voltage was maintained at a value of approximately 25 kilovolts.

It is noted that in some applications the anode of diode 158 can be coupled directly to circuit terminal A rather than the junction of resistors 140 and 142. When such a connection is made, the resistance value of resistor 156 can be adjusted to lower the voltage at terminal A such that the Zener diode 132 would no longer operate in the Zener operating region during the failure mode of operation of diode 158. Also in some applications, the voltage across S-shaping capacitor 37 which closely resembles the waveform of the voltage across capacitor 56 can be employed to supply the control voltage to switch the protection diode 158 into and out of conduction.

It is noted that in other types of deflection circuits, such as those including a bipolar transistor output stage, the high voltage may be held at a safe level by causing the failure sensing circuitry to increase the frequency of the horizontal drive signals to provide the desired high voltage limiting protection. The increase in frequency may be effected by applying the negative going failure sensing voltage developed across capacitor 56 which may be matrixed in a suitable manner with the AFC voltage in a polarity to increase the operating frequency of the oscillator, or may be applied to the same point as shown in the drawing, but with the circuit modified to incorporate an opposite conductivity transistor and opposite polarity voltages. In any type of output circuit, the protection circuit can be employed to completely shut off the deflection signal generator, thereby preventing the generation of high voltage by the deflection output stage.

What is claimed is:

1. In a high voltage hold down circuit including a deflection signal generator for developing deflection frequency signals, a deflection output circuit including a damper diode to limit the amplitude of flyback pulses present in said deflection output circuit to substantially a single polarity, and a high voltage generation circuit which responds to the amplitude and frequency of said flyback pulses to develop a high voltage, a circuit for sensing the absence of said flyback pulse limiting and for reducing any tendency for the developed high voltage to increase to a level at which X-radiations may be produced in response to the resulting increase in flyback pulse amplitude, comprising:

circuit means coupled to said deflection output circuit for monitoring an indicant of said high voltage and for developing a control signal of a first magnitude when said high voltage is within a prescribed operating range during normal operation of said damper diode in limiting the amplitude of flyback pulses and of a second magnitude when said high voltage is in excess of said operating range due to a decrease in the limiting of the flyback pulse amplitude provided by said diode; and means, responsive to said control signals, coupled from said circuit means to said deflection signal generator, to reduce the frequency of deflection signals developed by said deflection signal generator, the frequency of said flyback pulses, and the high voltage developed as a result, substantially only in response to control signals of said second magnitude, indicating a decrease in damper diode limiting action, the resulting high voltage then developed being restrained to within its prescribed operating range.

2. In a high voltage hold down circuit including a deflection signal generator for developing deflection frequency signals, a deflection output circuit including a diode to limit the amplitude of flyback pulses present in said deflection output circuit to substantially a single polarity, and a high voltage generation circuit which responds to the amplitude and frequency of said flyback pulses to develop a high voltage, a circuit comprising:

circuit means coupled to said deflection output circuit for monitoring an indicant of said high voltage and for developing a control signal of a first magnitude when said high voltage is within a prescribed range of operation and of a second magnitude when said high voltage is in excess of said operating range due to a decreased limiting action of said diode;

means coupled from said circuit means to said deflection signal generator to reduce the frequency of deflection signals developed by said deflection signal generator, to reduce the frequency of said flyback pulses, and to reduce the high voltage developed as a result, substantially only in response to control signals of said second magnitude, the resulting high voltage then developed being restrained to within its prescribed operating range; and wherein said means coupled from said deflection signal generator to said circuit means includes a diode, said diode being reverse biased in response to the application of control signals of said first magnitude from said circuit means but being forward biased in response to the application of control signals of said second magnitude from said circuit means.

3. A circuit as defined in claim 2 wherein said circuit means includes:

a flyback transformer in said horizontal output circuit, said transformer including a primary winding, and a capacitor serially coupled to said primary winding of said flyback transformer and responsive to current flowing in said primary winding during the normal operation of said diode to provide a first voltage across said capacitor, and response to current flowing in said primary winding in the absence of conduction of said diode to provide a second voltage across said capacitor.

4. A circuit as defined in claim 3 wherein said diode is coupled from said deflection signal generator to said capacitor at the junction of said capacitor to said flyback transformer primary winding and poled to conduct only in response to said second voltage developed across said capacitor.

5. A circuit as defined in claim 4 wherein a current limiting resistor is included between said diode and said capacitor.

6. A deflection circuit comprising:

a voltage controlled oscillator for developing deflection frequency signals, a deflection output device conductive in response to the application of said deflection frequency signals to a control element thereon to provide deflection current during a portion of each deflection cycle, a deflection output transformer having a primary winding, a capacitor serially coupled to said primary winding of said deflection output transformer, the series combination coupled across said deflection output device, a damper diode coupled across said deflection output device and poled to conduct current during a different portion of each deflection cycle, which current charges said capacitor serially coupled to said primary winding of said deflection output transformer, a high voltage generating circuit coupled to said deflection output transformer and responsive to the peak-to-peak amplitude and frequency of voltage pulses therein for developing a relatively high voltage, switching means coupled to said capacitor and to a control element of said voltage controlled oscillator, said switching means responsive to decreases in the voltage across said capacitor caused by said damper diode conduction path being removed to clamp the voltage at said control element of said oscillator to a value which reduces the frequency of operation of said oscillator in a manner to reduce the frequency of said voltage pulses and thereby prevent the development of an excessive high voltage by said high voltage generation circuit in the event said damper diode becomes inoperative; and wherein said switching means comprises a diode having an anode terminal coupled to said control element of said voltage controlled oscillator and a cathode terminal coupled to said capacitor.

7. A circuit as defined in claim 6 wherein said deflection circuit comprises an SCR type deflection circuit including reactive circuit means coupled from a source of operating potential to said deflection output transformer and wherein said diode switching means operates to lower the frequency of said deflection frequency signals developed by said voltage controlled oscillator in the event said damper diode conduction path is open circuited.

8. A circuit as defined in claim 6 and further including a current limiting resistor coupled in series relationship with said diode switching means.

* * * * *